Dec. 5, 1950     T. G. A. SILLERS     2,532,647

MEANS OF SWITCH POSITION INDICATION

Filed Dec. 13, 1947

Inventor
Thomas G. A. Sillers
by John Stevens Lieb
Agent

Patented Dec. 5, 1950

2,532,647

UNITED STATES PATENT OFFICE 2,532,647

MEANS OF SWITCH POSITION INDICATION

Thomas G. A. Sillers, Wauwatosa, Wis., assignor to Allis-Chalmers Manufacturing Company, Milwaukee, Wis., a corporation of Delaware Application December 13, 1947, Serial No. 791,551

4 Claims. (Cl. 177—311)

This invention relates to electro-responsive switch position indicating means and particularly to means for electrically indicating the positive electrical connection of circuits and the principal object of the invention is the provision of new and improved electro-responsive switch position indicating means.

In an electrical distribution system where relatively high voltages obtain, it is common practice to provide switching means for isolating individual conductors from the system, and switching means for grounding individual conductors that have been so isolated. In this way, a conductor may be de-energized, grounded, and given a zero potential. So long as the conductor remains grounded it can be relatively safely handled, even where the conductor in question is accidentally reconnected to the system after isolation. But the relative safe condition only persists where the conductor in question is positively grounded through the ground switching means. If the relatively engageable contacts of the ground switching means fail to positively engage upon closing, or are so corroded as to preclude a positive electrical connection, or become broken or inoperative, the conductor will appear to an observer to be grounded, when actually it is ungrounded. To protect personnel against the hazards of handling live and ungrounded circuits it is necessary to provide electrical means for positively indicating when the circuit is electrically grounded, since mechanical indicating means merely disclose the relative position of the switch parts and do not give a true indication of the conductivity of the grounding means.

Therefore an object of the invention is the provision of new and improved electro-responsive means for indicating the positive electrical connection of a conductor to ground.

Another object of the invention is the provision of new and improved electro-responsive means for indicating the positive electrical connection of two conductors.

Another object of the invention is the provision of new and improved electro-responsive means for indicating the electrical connection of two conductors independently of current flowing through the conductors.

Another object of the invention is the provision of new and improved electro-responsive means for indicating a positive electrical connection of two conductors where the means for connecting said conductors is concealed from view.

The novel features of this invention and how the objects are obtained will appear from this specification and the accompanying drawings showing several embodiments of the invention and forming part of this specification and all the novel features are intended to be pointed out in the claims.

Figure 1:
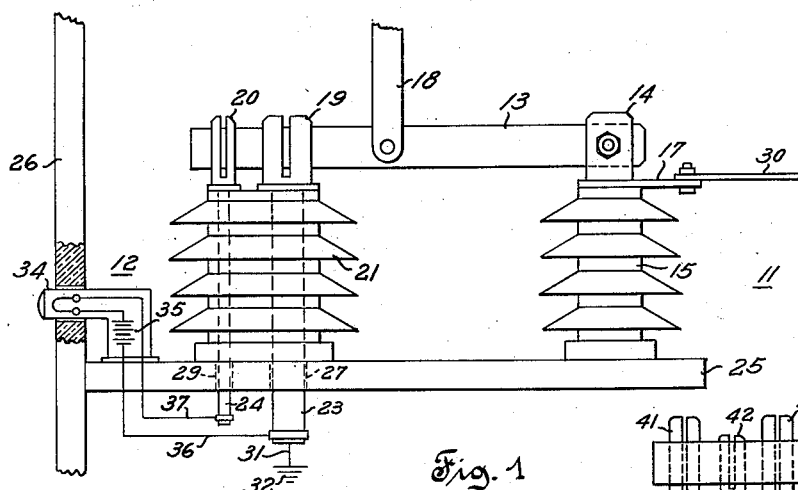
Fig. 1 is an elevation view of apparatus comprising an embodiment of the invention.

As shown in Fig. 1 of the drawings, the apparatus comprises an electrical switch 11, and switch position indicating means 12 therefor. The switch 11, as a single-throw knife switch in closed position, comprises a hinged blade 13 supported by a clip 14 carried by an insulating bushing 15, the clip 14 having an outward extending terminal connector 17. The blade 13 forms a movable contact and is swingable about the clip 14 by means of an arm 18 pivotally connected to a median portion of the blade 13, only a fragmentary portion of the arm 18 being indicated. The arm 18 may be actuated by any suitable manual or automatically controlled means not shown, to open or close the switch 11.

The blade 13 is adapted, upon closing, to simultaneously engage connective means comprising a stationary main contact clip 19 and a stationary auxiliary contact clip 20, the clips 19, 20 being carried by suitable insulating means, as an insulating bushing 21. Although a dual purpose bushing 21 has been disclosed, individual bushings may be provided for the respective contact clips 19, 20 without departing from the invention.

The main contact clip 19 and auxiliary contact clip 20 are respectively connected to conducting studs 23, 24 leading through and extending below the base of the bushing 21, the stud 23 being mechanically spaced and electrically insulated from stud 24. The contact clips 19, 20 are of unequal proportions. The main contact clip 19 normally carries the rated current of the switch 11 and is therefore necessarily of larger proportions than the auxiliary contact clip 20 which is adapted to carry a relatively smaller signalling current.

The bushings 15, 21 supporting the switch components are fastened by any suitable means to a base 25 of any suitable material, extending rearward from a panel 26 also of any suitable material, the base 25 being provided with holes 27, 29 of the proper dimension to accommodate the depending studs 23, 24 which, if the base 25 is of conducting material, are suitably insulated therefrom.

The switch 11 is adapted to connect two circuits, or as shown, two conductors, one conductor being represented by a bus 30, only a fragment of which is shown, connected to the terminal connector 17, and the other conductor 31 being schematically represented by a line to ground 32, the conductor 31 being connected at its other end to the stud 23. Although the conductor 31 is shown leading to ground 32, it may equally well lead to an ungrounded or otherwise independent conductor or circuit, not shown, without departing from the invention.

To indicate the open or closed position of the blade 13 of the switch 11 relative to the main contact clip 19, position indicating means 12, as hereinbefore mentioned, is associated with the switch 11. The switch position indicating means 12 comprises in series circuit, an electro-responsive indicating means, shown schematically as an electric lamp 34, and a source of signalling current therefor, shown schematically as a battery 35. The lamp 34 may be mounted, in any suitable manner, in the panel 26, where it can be visually observed by an observer standing before the panel 26, it being customary to interpose an insulating panel between the observer and the switch for reasons of safety. When so mounted the switch 11 is concealed from the observer's view. Although the lamp 34 is shown mounted in the panel 26 in front of the switch 11, it may be mounted in a separate panel, independent of and some distance from the switch itself.

The signalling circuit comprising the lamp 34 and battery 35 is connected at one of its ends through conductor 36 and stud 23 to the main contact clip 19 and at the other of its ends through conductor 37 and stud 24 to the auxiliary contact clip 20. Thus the signalling circuit may be traced from the main contact clip 19 through stud 23, conductor 36, battery 35, lamp 34, conductor 37, stud 24, to the auxiliary contact clip 20. The signalling circuit can only be closed by engagement of the switch blade 13 with the main contact clip 19 and auxiliary contact clip 20. Thus when the blade 13 is thrown to the closed position as shown in Fig. 1, the signalling circuit becomes closed and the lamp 34 will light, indicating an electrically conductive connection between the bus 30 and the ground 32. If this connection is broken, either through opening of the switch 11, or through improper contact of the blade 13 with the contact clips 19, 20, the light will go out, indicating to the observer that the conductor 30 is ungrounded.

The stud 19 forms a direct coupling means between a first circuit comprising the conductor 30, and a second circuit, shown as the signalling circuit comprising the lamp 34 and battery 35. Thus when the switch blade 13 is closed on the contact clips 19, 20, the first and second circuits are directly coupled.

The described switch position indicating means 12 furnishes a positive indication of whether the switch 11 is in the electrically open or closed position and further furnishes a positive index to the electrical conductivity of the switch contacts 13, 19 when closed.

The switch indicating means 12, may be nondetachably connected to the switch 11, or may be detachably connected to the switch 11 in order to utilize a single indicating means with a plurality of switches.

Figure 2:
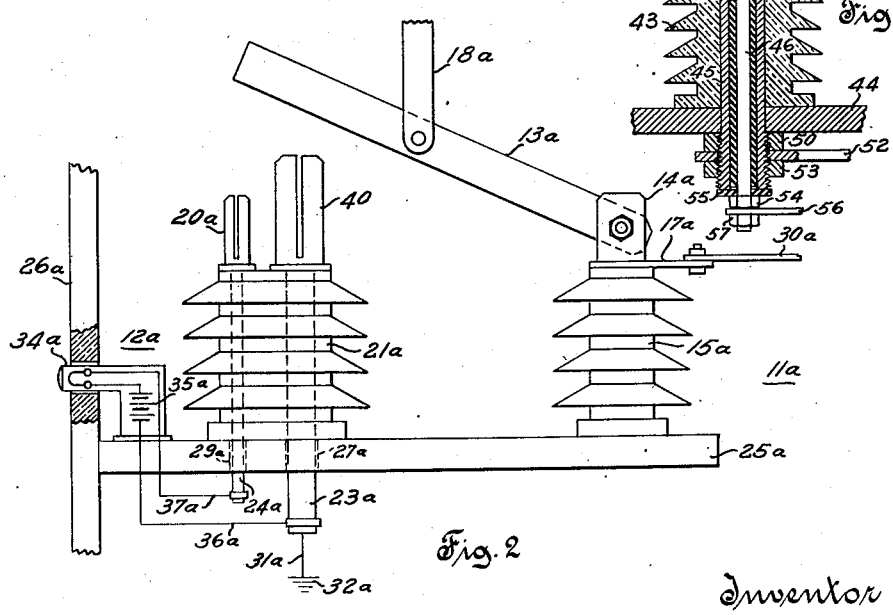
Fig. 2 is an elevation view of apparatus comprising an alternative embodiment of the invention.

In Fig. 2 of the drawings, the apparatus shown is similar to the apparatus shown in Fig. 1 with one exception; the main contact clip 40 of the embodiment of Fig. 2 extends upward a greater distance than its companion auxiliary contact clip 20a. All other parts of the apparatus in Fig. 2 are similar to like parts of the apparatus in Fig. 1 and are indicated by like reference characters followed by the suffix a. As shown in Fig. 2, the switch 11a is in the open position.

By extending the main contact clip 40 above the level of the auxiliary contact clip 20a, the blade 13a of the switch 11a, upon closing from the open position, is obliged to first engage the clip 40 before engaging the clip 20a. The sequential engagement of the clips 40, 20a by the switch blade 13a is advantageous for the following reason:

If the conductor 30a is not at zero potential at the instant that the blade 13a of the switch 11a makes contact with the clip 40 to ground, the closed switch 11a is obliged to carry fault current. Since the main contact clip 40 and associated stud 23a are adapted to carry the fault current, whereas the electro-responsive indicating means 12a is not, it is desirable that any fault current flowing through the blade 13a be shunted from the signalling circuit comprising the auxiliary contact clip 20a, stud 24a, and lamp 34a to ground 32a. This is effectively accomplished by extending the main contact clip 40 upward as heretofore described, so as to force the blade 13a to first engage the clip 40 before engaging the clip 20a, thereby preventing possible flow of the entire fault current through the auxiliary contact clip 20a and associated signalling circuit.

The switch position indicating means 12a is electrically responsive to indicate the positive electrical connection of the two conductors 30a, 31a. The electro-responsive switch position indicating means is further operative to indicate the closed switch position regardless of wether or not the circuit grounded by the switch is at zero potential when the switch is closed. Thus the lamp 34a will light upon closure of the switch 11a even though fault current is carried by the switch 11a following closing.

In each of the inventive embodiments hereinbefore described, as for example in the switch 11 of Fig. 1, the connection to ground 32 is made through conductive studs 23, 24, which are disposed in spaced parallel noncoaxial relation within the bushing 21. It is proposed, as an alternative embodiment, to provide a switch in which the connection to ground is made through coaxially disposed conductive studs supported by a suitable bushing. Accordingly, in Fig. 3 of the drawings, the apparatus fragmentarily shown comprises an electrical switch 11b having a movable blade 13b corresponding to the blade 13 of Fig. 1.

The blade 13b forms a movable contact and may be hinged and operated in the same manner as is blade 13 in Fig. 1, or, the blade 13b may be carried and operated by other suitable means not shown. The blade 13b is adapted, upon closing, to sequentially engage connective means comprising two similar stationary main contact clips 41 and an intermediate stationary auxiliary contact clip 42, the clips 41, 42 being carried by suitable means, such as a bushing 43.

A base 44, comparable to the base 25 of Fig. 1, but preferably of conductive material, supports the bushing 43. The choice of either conducting or insulating materials for the base 44 depends upon the type of service for which the switch 11b is intended.

The main contact clips 41 and the auxiliary contact clip 42 are respectively connected to conductive studs 45, 46, leading through and extending below the base of the bushing 43. The main contact clips 41 extend upward a greater distance than their companion auxiliary contact clip 42 to insure sequential engagement of the blade 13b with the clips 41, 42 for reasons comparable to those recited hereinbefore for switch 11a of Fig. 2.

The stud 45 comprises a cylinder having a conductive wall defining a central passage 47 in which the stud 46 is coaxially disposed. Interposed between the stud 46 and the wall of stud 45 is a cylindrical insulator 48 having a radially extending upper flange 49 which insulates the clips 41, 42 one from another. The stud 45 pierces the base 44, is in contact therewith, and extends for a short distance below the base 44. The stud 45 cooperates with its associated clips 41 to clamp the bushing 43 between the clips 41 and the base 44 by means of a clamping nut 50 abutting the underside of the base 44 and engaged with the threaded end portion of the stud 45. The clamping nut 50 also serves to retain the stud 45 within the bushing 43.

A suitable terminal connector 52 is secured in electrical contact with the stud 45 by means of a lock nut 53 cooperating with the stud 44 to clamp the connector firmly between the nuts 50, 53.

The coaxially disposed stud 46 extends a short distance below the stud 45 and insulator 48 and is retained in position relative to the stud 45 by a nut 54 and insulating washer 55 cooperating with the stud 45. A terminal connector 56 is secured in electrical contact with the stud 46 in the same manner as connector 52 is secured to the stud 45, a lock nut 57 retaining the connector 56 in place.

The studs 45, 46, may be severally connected to an indicating means in the same manner as are the studs 23, 24, in Fig. 1. And if the switch 11b is to be used as a grounding means the stud 45 may be connected to ground as is the stud 23 in Fig. 1.

When the stud 45 is connected to ground, a conducting material such as steel may be used for the base 44, and the base 44 connected to ground by suitable means, not shown.

The operation of the switch 11b is similar to the operation of switch 11a in that fault current when present is induced to flow through the main stud 45, the current being shunted from the auxiliary stud 46 forming part of a signalling circuit not shown; the function of stud 46 being comparable to the function of stud 24a in Fig. 2.

By providing two contact clips 41 engageable by the blade 13b, more switch contact points are made available and the contact resistance of the switch 11b is substantially reduced. Furthermore by having multiple common contact clips, the chance of accidentally opening the switch through burning off of one clip is materially reduced.

Figure 3:
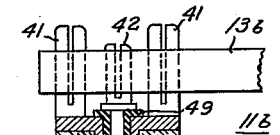
Fig. 3 is a fragmentary elevation view of apparatus comprising a further alternative embodiment of the invention.

As illustrated in the various figures, the switch 11 is adapted for operation in an insulating fluid medium, such as air. However, the switch 11 may be operated submerged in an insulating fluid such as oil. When so operated the embodiment of Fig. 3 is preferred.

From the foregoing it will be apparent to those skilled in the art that the illustrated embodiments of the invention provide a new and improved electro-responsive switch indicating means and accordingly accomplishes the objects of the invention.

On the other hand, it will be obvious to those skilled in the art that the illustrated embodiments of the invention may be variously changed or modified, or features thereof, singly or collectively, embodied in other combinations than those illustrated, without departing from the spirit of the invention, or sacrificing all of the advantages thereof, and that accordingly the disclosure herein is illustrative only and the invention is not limited thereto.

It is claimed and desired to secure by Letters Patent:

1. In an electrical switch, a pair of insulating bushings, a movable current-carrying contact supported by one of said bushings, a plurality of conductive assemblies supported by the other of said bushings, each of said assemblies comprising a conductive stud and at least one engageable contact clip connected to said stud, one of said studs being disposed in coaxial relation with respect to another of said studs for providing several current paths through said other of said bushings, and said clips being arranged in stepped relation with respect to said movable contact whereby said movable contact engages at least one of said clips connected to said one of said studs prior to engaging another of said clips connected to said another of said studs upon closing said switch against said clips.

2. A ground safety device comprising an electro-responsive indicating means and a source of current exclusively therefor, said source of current having terminals of opposite polarities, one of said terminals being connected to said indicating means, a ground lead, a conductor, a switch comprising a movable contact and first and second contacts conductively engageable by said movable contact for connecting said conductor to said ground lead through said first contact, said second contact interconnecting said indicating means with the other terminal of said source of current through said movable contact for causing energization of said indicating means only if said movable contact connects said conductor to said ground lead through said movable contact and said first contact.

3. A control device for controlling the connection between a first circuit and a second circuit and for energizing a signalling circuit comprising indicating means and a source of current exclusively therefor for manifesting an electrically conductive connection between said first circuit and said second circuit comprising in combination, a contact element connected with said second circuit and with said signalling circuit, another contact element connected with said first circuit, a third contact element connected with said signalling circuit, and contact means simultaneously engageable with said first, second and third contact elements to establish an electrical connection between said first and second contact elements for connecting said first and second circuits and between said second and third contact elements for feeding current from said source only to said indicating means through said contact means.

4. In an electric switch, a pair of insulating bushings, a movable contact supported by one of said bushings, a plurality of conductive assemblies supported by the other of said bushings, each of said assemblies comprising a conductive stud and at least one engageable contact clip connected to said stud; one of said studs being disposed in coaxial relation with respect to another of said studs for providing several current paths through said other of said bushings, and said clips being of substantially equal length whereby said movable contact engages said clips substantially simultaneously upon closing of said switch against said clips.

THOMAS G. A. SILLERS.

REFERENCES CITED

The following references are of record in the file of this patent:

UNITED STATES PATENTS

| Number | Name | Date |
|---|---|---|
| 742,547 | Wright | Oct. 27, 1903 |
| 768,925 | Ayer | Aug. 30, 1904 |
| 774,896 | Robertson | Nov. 15, 1904 |
| 849,684 | Hewlett | Apr. 9, 1907 |
| 877,576 | Lincoln | Jan. 28, 1908 |
| 1,649,011 | Bakken | Nov. 15, 1927 |

FOREIGN PATENTS

| Number | Country | Date |
|---|---|---|
| 224,047 | Great Britain | Nov. 6, 1924 |